US009151242B2

(12) United States Patent
Okamoto et al.

(10) Patent No.: US 9,151,242 B2
(45) Date of Patent: Oct. 6, 2015

(54) APPARATUS FOR CONTROLLING ENGINE WARMING-UP

(71) Applicant: DENSO CORPORATION, Kariya, Aichi-pref. (JP)

(72) Inventors: Tsuyoshi Okamoto, Kariya (JP); Tsutomu Tashiro, Nagoya (JP)

(73) Assignee: DENSO CORPORATION, Kariya (JP)

( * ) Notice: Subject to any disclaimer, the term of this patent is extended or adjusted under 35 U.S.C. 154(b) by 290 days.

(21) Appl. No.: 13/688,621

(22) Filed: Nov. 29, 2012

(65) Prior Publication Data

US 2013/0144515 A1 Jun. 6, 2013

(30) Foreign Application Priority Data

Dec. 1, 2011 (JP) ................................ 2011-263424

(51) Int. Cl.

*G06F 19/00* (2011.01)
*F02D 45/00* (2006.01)
*F02D 41/06* (2006.01)

(52) U.S. Cl.

CPC .............. *F02D 45/00* (2013.01); *F02D 41/068* (2013.01); *F02D 2200/503* (2013.01); *F02D 2250/24* (2013.01)

(58) Field of Classification Search

CPC ... B60W 20/106; B60W 10/06; B60W 10/08; F02D 1/06–1/068; F02D 2250/24

USPC ......................... 701/113, 110; 180/65.1–65.8

See application file for complete search history.

(56) References Cited

U.S. PATENT DOCUMENTS

| | | | | |
|---|---|---|---|---|
| 6,931,318 | B2 * | 8/2005 | Kaita et al. | 701/113 |
| 7,527,030 | B2 * | 5/2009 | Fukushima et al. | 123/179.3 |
| 7,672,762 | B2 * | 3/2010 | Matsubara | 701/22 |
| 7,765,964 | B2 * | 8/2010 | Ichimoto | 123/90.15 |
| 2003/0051930 | A1 | 3/2003 | Matsubara et al. | |
| 2005/0256632 | A1 * | 11/2005 | McGee et al. | 701/101 |

(Continued)

FOREIGN PATENT DOCUMENTS

| | | |
|---|---|---|
| JP | 2005-220756 | 8/2005 |
| JP | 2006-193137 | 7/2006 |
| JP | 4155962 | 7/2008 |
| JP | 4300600 | 5/2009 |

(Continued)

OTHER PUBLICATIONS

Office Action (2 pages) dated Sep. 9, 2014, issued in corresponding Japanese Application No. 2011-263424 and English translation (2 pages).

*Primary Examiner* — Lindsay Low
*Assistant Examiner* — Robert Werner
(74) *Attorney, Agent, or Firm* — Nixon & Vanderhye P.C.

(57) ABSTRACT

A vehicle has an engine as a driving source. The vehicle has a charge system which generates electric power by using a part of rotational output of an engine, and charges a battery by the generated electric power. Optimal shaft efficiency points are combinations of revolution speed and torque of the engine for maximizing the shaft efficiency. Optimal shaft efficiency line passes through the optimal shaft efficiency points for each engine output level. Warming-up operation line is defined by shifting the optimal shaft output efficiency line to a side to increase heat loss. An engine controller stores the lines. The engine controller performs a warming-up operation by operating the engine at a revolution speed and a torque on the warming-up operation line. The engine controller controls the battery to reduce possibilities of a full charge at a next warming-up.

7 Claims, 7 Drawing Sheets

(56) References Cited

U.S. PATENT DOCUMENTS

| | | | | |
|---|---|---|---|---|
| 2009/0107743 | A1* | 4/2009 | Alston et al. | 180/65.21 |
| 2009/0118090 | A1* | 5/2009 | Heap et al. | 477/98 |
| 2010/0204864 | A1* | 8/2010 | Ando et al. | 701/22 |
| 2011/0178665 | A1* | 7/2011 | Yoshioka et al. | 701/22 |
| 2012/0041624 | A1* | 2/2012 | Stewart et al. | 701/22 |

FOREIGN PATENT DOCUMENTS

| | | |
|---|---|---|
| JP | 2010-036694 | 2/2010 |
| JP | 2010-241190 | 10/2010 |
| JP | 2011-195065 | 10/2011 |
| JP | 2011-223839 | 11/2011 |
| WO | WO 2010/122393 | 10/2010 |

* cited by examiner

APPARATUS FOR CONTROLLING ENGINE WARMING-UP

CROSS REFERENCE TO RELATED APPLICATION

This application is based on Japanese Patent Application No. 2011-263424 filed on Dec. 1, 2011, the disclosure of which is incorporated herein by reference.

TECHNICAL FIELD

The present disclosure relates to an apparatus for controlling engine warming-up which is applicable to a vehicle which has a charging system for generating electric power by using a part of an engine output and charge the generated electric power to a battery.

BACKGROUND

JP3673200B discloses an apparatus which performs an engine warming-up operation. In this engine warming-up operation, an increase of an engine temperature is promoted and accelerated by increasing an amount of heat loss by retarding ignition timing.

Here, an engine output, which is a work amount of the engine demonstrated per unit time, includes a rotational output, i.e., kinetic energy, on a crankshaft and a heat loss, i.e., thermal energy. Fuel consumption, i.e., fuel consumption rate, may be improved by reducing the heat loss and by increasing a ratio, i.e., shaft efficiency, of the rotational output to an amount of fuel consumption. By performing the ignition timing retarding, it is possible to increase the heat loss, and to promote a warming-up. However, the shaft efficiency becomes worse and the fuel consumption becomes worse.

On the other hand, vehicles, e.g., hybrid vehicles, which has a charge system for generating electric power by using a part of rotational output and charging the generated electric power to a battery is known. JP4300600B discloses a warming-up operation for such a hybrid vehicle. In this operation, the warming-up is accelerated by increasing the engine output. Simultaneously, an amount of increased rotational output caused by increasing the engine output is assigned to generate electric power, and generated electric power is charged to a battery. Therefore, it is possible to promote temperature increase without worsening shaft efficiency.

Points A, B1, C1, D1, and E1 shown in FIG. 3, may be referred to as optimal shaft efficiency points which are combinations of revolution speed of the engine and torque which maximize the shaft efficiency. A line Em shown in FIG. 3 may be referred to as an optimal shaft efficiency line which can be obtained by drawing a line passing through the optimal shaft efficiency points for each engine output level. In the operation, when an amount of temperature increase of the engine required for a warming-up is insufficient, an engine output is increased along the optimal shaft efficiency line Em so that the revolution speed and the torque are adjusted on the optimal shaft efficiency point. Thereby, it is possible to promote temperature increase without worsening the shaft efficiency.

SUMMARY

However, if the warming-up operation disclosed in JP4300600B is performed when the battery is charged to a level close to full, there may be a case that the battery reaches to a full charge level. In such a case, the warming-up control cannot be performed or completed.

It is an object of the present disclosure to provide an apparatus for controlling engine warming-up which is capable of reducing possibilities that the warming-up operation cannot be performed or completed. It is an object of the present disclosure to provide an apparatus for controlling engine warming-up which is capable of reducing possibilities that the warming-up operation with improved shaft efficiency cannot be performed or completed.

According to one of embodiments, an apparatus for controlling engine warming-up is provided. The apparatus is designed to be applied to a vehicle having a charge system. The charge system generates electric power by using rotational output of an engine for a driving source of the vehicle and charges a battery by the generated electric power. The apparatus comprises a storing section which stores a warming-up operation line which is defined by shifting an optimal shaft output efficiency line to a side to increase heat loss. The optimal shaft efficiency line is determined to pass through optimal shaft efficiency points for each engine output level. The optimal shaft efficiency points are combinations of revolution speed and torque of the engine for maximizing the shaft efficiency. The shaft efficiency is a rate of the rotational output of the engine to a fuel consumption. The apparatus further comprises a performing section which performs a warming-up operation by operating the engine at a revolution speed and a torque on the warming-up operation line.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, a plurality of embodiments of the present disclosure are described based on the drawings. Components and parts corresponding to the components and parts described in the preceding description may be indicated by the same reference number and may not be described redundantly. In a case that only a part of component or part is described, other descriptions for the remaining part of component or part in the other description may be incorporated. The embodiments can be partially combined or partially exchanged in some forms which are clearly specified in the following description. In addition, it should be understood that, unless trouble arises, the embodiments can be partially combined or partially exchanged each other in some forms which are not clearly specified.

(First Embodiment)

Figure 1:
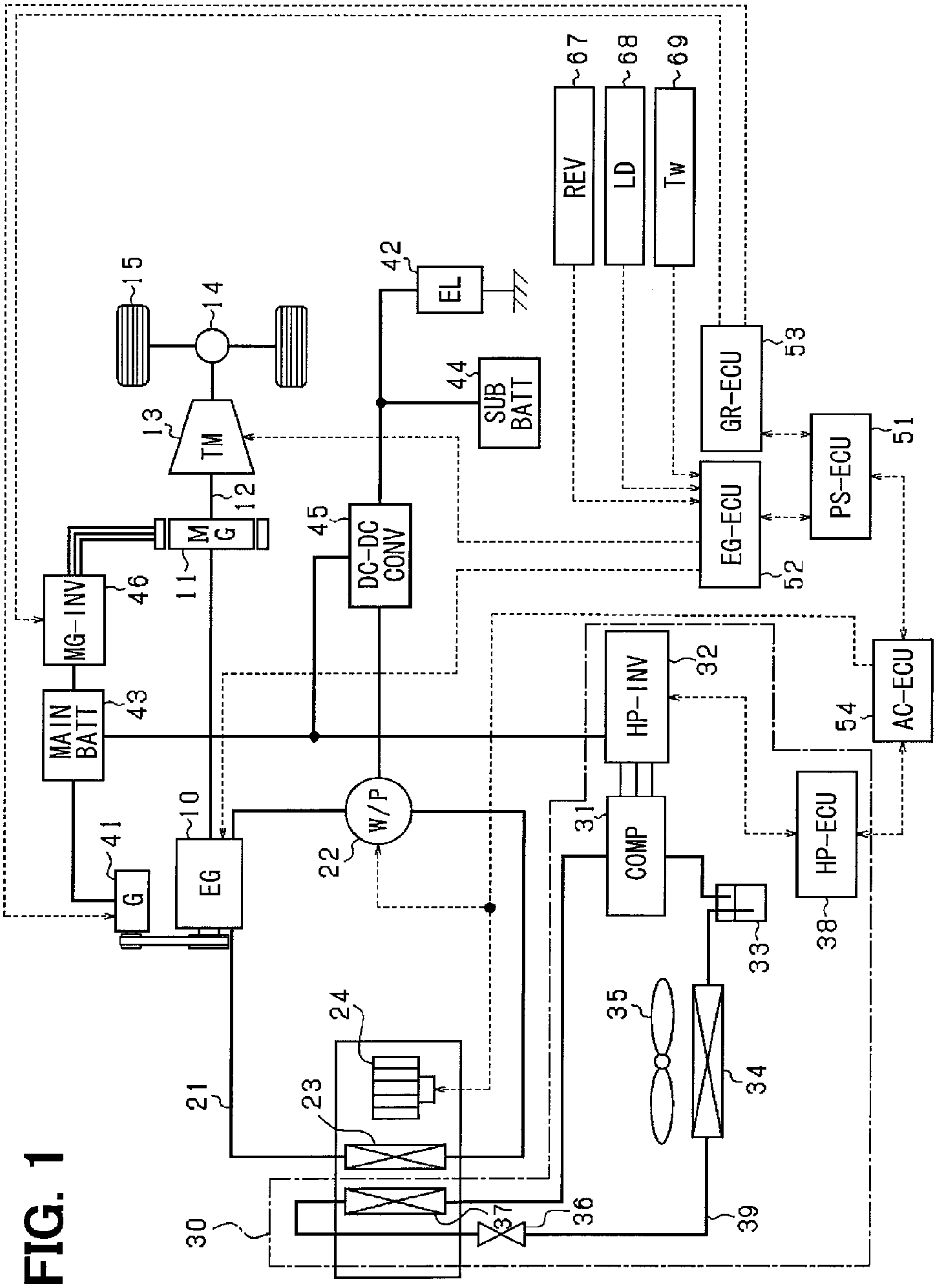
FIG. 1 is a diagram showing a power system for a vehicle according to a first embodiment of the present disclosure.

FIG. 1 shows a system on a vehicle. The system provides a warming-up control device which is an apparatus for controlling engine warming-up. The system has an engine (EG) 10 and a motor (MG) 11. Both the engine 10 and the motor 11 can perform driving sources for the vehicle. The engine 10 is an internal combustion engine which rotates a shaft 12 by combusting fuel and also generates heat by combusting fuel. The motor 11 is an electric motor generator which can be performed as both a motor and a generator. The motor 11 has a rotor coupled with the shaft 12.

The engine 10 rotates the shaft 12. The motor 11 also rotates the shaft 12. The motor 11 may be rotated by the shaft 12 and works as the generator. The shaft 12 is also coupled with a transmission (TM) 13. The transmission 13 is coupled with a differential gear 14 and driven wheels 15. Therefore, driving force from the engine 10 and the motor 11 is transmitted to the driven wheels 15 via the transmission 13 and the differential gear 14. The transmission 13 is a continuously variable transmission which can change gear ratio continuously. For example, the transmission 13 uses friction to change gear ratio.

In deceleration of the vehicle, rotating force on the driven wheels 15 transmitted to the motor 11 via the differential gear 14 and the transmission 13. At this time, the motor 11 may perform a regenerative power generation. The motor 11 may be also driven by the engine 10 to perform power generation.

A jacket is formed in a cylinder block and a cylinder head of the engine 10. The jacket allows coolant, such as cooling water, flowing and cooling the engine 10. The coolant is supplied in a circulated manner. The coolant passage 21, which is provided by piping etc., is connected to the jacket. An electric motor driven pump (W/P) 22 for circulating the coolant is disposed on the coolant passage 21. A flow amount of the coolant, which circulates through the coolant passage 21, is adjusted by controlling an amount of discharge of the pump 22.

The coolant passage 21 is extended towards a heater core 23 at an exit side of the engine 10. The coolant passage 21 is provided to return to the engine 10 after the heater core 23. As a result, the coolant flows from the engine 10 to the heater core 23, and returns to the engine 10. The heater core 23 is a component of an air conditioner for the vehicle. The air conditioner has a blower fan 24 for generating air flow toward a passenger compartment. The heater core 23 is disposed on an air passage through which an air flow generated by the blower fan 24 flows. The heater core 23 heats the air flow and warms the passenger compartment.

Heating amount supplied to the passenger compartment from the coolant via the heater core 23 is controlled by controlling the discharge amount of the pump 22 and the discharge amount of the blower fan 24.

The system has an electric heat source. The electric heat source is provided by a refrigerant cycle system which performs as a heat pump system 30. The heat pump system 30 has components 31-38. The compressor (COMP) 31 is an electric driven compressor. The compressor 31 is driven by the heat pump inverter (HP-INV) 32. The accumulator 33 is disposed on a suction side of the compressor 31. The outside heat exchanger 34 is disposed on an outside of the passenger compartment. The outside heat exchanger 34 is disposed on a low pressure side. The outside fan 35 generates air flow passing through the outside heat exchanger 34. The expansion device 36 is disposed between a high pressure side and the low pressure side. The inside heat exchanger 37 is disposed on the air passage. The inside heat exchanger 37 provides a heat exchanging member. The inside heat exchanger 37 is disposed on the high pressure side. The heat pump controller (HP-ECU) 38 controls the components 31-37. The components 31, 33, 34, 36, 37 are connected to provide a closed refrigerant cycle by conduits 39.

The compressor 31 sucks refrigerant from the low pressure side. The compressor 31 compresses the refrigerant and discharges high pressure refrigerant to the high pressure side. The inside heat exchanger 37 receives the high pressure refrigerant. The inside heat exchanger 37 heats the air flow and warms the passenger compartment. The refrigerant dissipates heat to the air.

The refrigerant discharged from the inside heat exchanger 37 is decompressed by the expansion device 36, and is sent out to the outside heat exchanger 34. The outside fan 35 sends air to the outside heat exchanger 34. The refrigerant absorbs heat from the air. Heated refrigerant is again sucked to the compressor 31 via the accumulator 33.

The compressor 31 is driven by electric power supplied from the inverter 32. The inverter 32 is controlled by the heat pump controller 38. Heating amount supplied to the passenger compartment from the heat pump system 30 is controlled by controlling driven state of the compressor 31 by the inverter 32 and the heat pump controller 38.

The system has electric power sources. One of the power sources is a generator (GR) 41 driven by the engine 10. One of the power sources is a main battery (MAIN-BATT) 43. The main battery 43 can be discharged and charged. The main battery 43 can be charged by the motor 11 and the generator 41. The main battery 43 supplies power to loads such as the inverter 32, the pump 22, and loads 42.

The system has a sub battery (SUB-BATT) 44. The sub battery 44 has a rated voltage that is lower than that of the main battery 43. For example, the sub battery 44 is 12V. The main battery 43 is 400V. The sub battery 44 supplies power to low voltage loads such as the pump 22 and other low voltage loads (EL) 42. The main battery 43 supplies power to high voltage electric loads such as the motor 11 and the compressor 31. The system has a DC-DC converter (DC-DC-CONN) 45. The DC-DC converter 45 at least performs a step-down voltage convert from the main battery 43 to the sub battery 44. Therefore, the main battery 43 can charge the sub battery 44. In other words the main battery 43 supplies power to all of the loads on the system. The system has an inverter (MG-INV) 46 for controlling the motor 11.

The system has controllers 51-54. The power source controller (PS-ECU) 51 is a higher rank controller which controls the other controllers. The engine controller (EG-ECU) 52 controls the engine 10 and the transmission 13. The generator controller (GR-ECU) 53 controls the motor 11, the generator 41 and the inverter 46. The air conditioner controller (AC-ECU) 54 controls the air conditioner including the heat pump system 30. Each of the ECUs 38, 51-54 is provided by a microcomputer having a storage medium readable by a computer. The storage medium is a non-transitory storage medium which stores a program readable by the computer. The storage medium can be provided by a solid state memory device, such as RAM and ROM, or a magnetic disc memory. The program, when executed by the processing device, makes the ECU to function as a device described, and makes the ECU to perform a control method described. The means provided by the ECU may be referred to as a functional block or a module which performs a predetermined function.

The power source controller 51 controls the pump 22, the blower fan 24, and the heat pump controller 38 via the air conditioner controller 54. The power source controller 51 controls the inverter 46 via the generator controller 53 in order to control the motor 11. The motor 11 is controlled to switch functions among a motor mode and a generator mode. In addition, a work output in the motor mode and an electric power generated in the generator mode are controlled by controlling the inverter 46.

The engine controller 52 carries out various controls for the engine 10 according to operational status of the engine 10. The system has a revolution speed sensor 67 for detecting a revolution speed (REV) of the engine 10. The system has an engine load sensor 68 for detecting an engine load (LD) of the engine 10. The engine load may be detected by an intake air amount or a vacuum pressure in an intake passage of the engine 10. The system has a coolant temperature sensor 69 for detecting a coolant temperature (Tw) indicative of an engine temperature. Signals from the sensors 67-69 are supplied to the engine controller 52.

The engine controller 52 inputs signals indicative of detected condition from the sensors. The engine controller 52 carries out several engine controls based on the sensor signals. The engine control may include a fuel injection control by an injector, an ignition timing control by an ignition device, a valve timing control by variable valve timing device installed on an intake side and/or exhaust side, and an intake air amount control by a throttle valve. Thereby, an engine output is controlled.

The engine output means a work amount, i.e., a work rate. The engine output includes a rotational output, i.e., kinetic energy, which is used to rotate the shaft 12, and a heat loss, i.e., heat energy.

The engine controller 52 controls the transmission 13 to change a gear ratio, reduction ratio, between the shaft 12 and the driven wheels 15. Thereby, a ratio between the revolution speed of the shaft 12 and the rotational torque of the shaft 12 is controlled. That is, the engine controller 52 controls the revolution speed and the rotational torque of the engine 10 to desired values by controlling the gear ratio. The revolution speed of the shaft 12 is expressed by a revolution number of the shaft 12 per unit time. The revolution speed of the shaft 12 corresponds to an engine rotational speed. Hereinafter the revolution speed of the engine 10 may also be referred to as REV. The rotational torque of the engine 10 may also be referred to as TQ.

A shaft efficiency of the engine 10 differs according to operational condition of the engine 10. The engine controller 52 performs the controls based on adaptive data predetermined and stored in the controller in order to make the shaft efficiency of the engine 10 to a desired value, e.g., the maximum value, according to the operational condition of the engine 10. The shaft efficiency can be shown by a fuel consumption amount per unit output of a rotational output. The shaft efficiency corresponds to the fuel consumption rate. The fuel consumption rate FCR has the unit "g/kWh", and is expressed by FCR=FC/RO, where FC is a fuel consumption amount (g/h) per unit time, and RO is a rotational output (kW) of the engine 10.

The engine 10 can be automatically started in some cases. For example, the engine 10 is automatically started when the residual charge in the main battery 43 is less than a predetermined threshold, or when an acceleration demand is not sufficiently satisfied only by a motor drive of the motor 11. Such automatic engine starts are called normal start operation for the engine 10 of the hybrid vehicle. In addition, the engine 10 may be automatically started when a warming-up of the engine 10 is required in some cases. For example, the engine 10 is automatically started in a low ambient temperature condition. The engine 10 is automatically started when the coolant temperature Tw detected by the sensor 69 is less than a predetermined threshold Twth. Such automatic engine starts are called warming-up starts for the hybrid vehicle.

In the warming-up operation of the engine 10, it is necessary to increase temperature rapidly and complete the warming-up early. In order to perform such a rapid warming-up, the engine controller 52 sets a time, which is necessary to complete the warming-up, based on the coolant temperature. The time may be referred to as a target warming-up completion time. The engine controller 52 also sets a target value of temperature increase based on the target warming-up completion time and the coolant temperature. The target value may be referred to as a target temperature increase. The temperature increase indicates a temperature difference from no warming-up operation.

The engine controller 52 performs a warming-up by promoting a temperature increase by increasing the engine output compared with the normal start. In detail, the engine controller 52 sets an increase amount of the engine output and a gear ratio at the time of control based on the coolant temperature Tw, the residual charge Vm in the main battery 43, and the target temperature increase at the time of control. The engine controller 52 provides a warming-up operation controlling means or module. The gear ratio is values of ratio of REV and TQ. Then, the engine controller 52 controls the engine 10 and the transmission 13 to perform a warming-up operation control in order to realize the engine output set in the above description, REV, and TQ.

The engine output is increased by performing the warming-up operation control, not only the heat loss is increased, but also an rotational output is increased. The generator controller 53 controls the inverter 46 to make the motor 11 to generate an electric power equivalent to an increased amount of the rotational output. The generator controller 53 provides a warming-up power-generation-control means or module for performing a warming-up power generation control. Thereby, an electric power is generated by the increased amount of the rotational output and is charged to the main battery 43.

Figure 2:
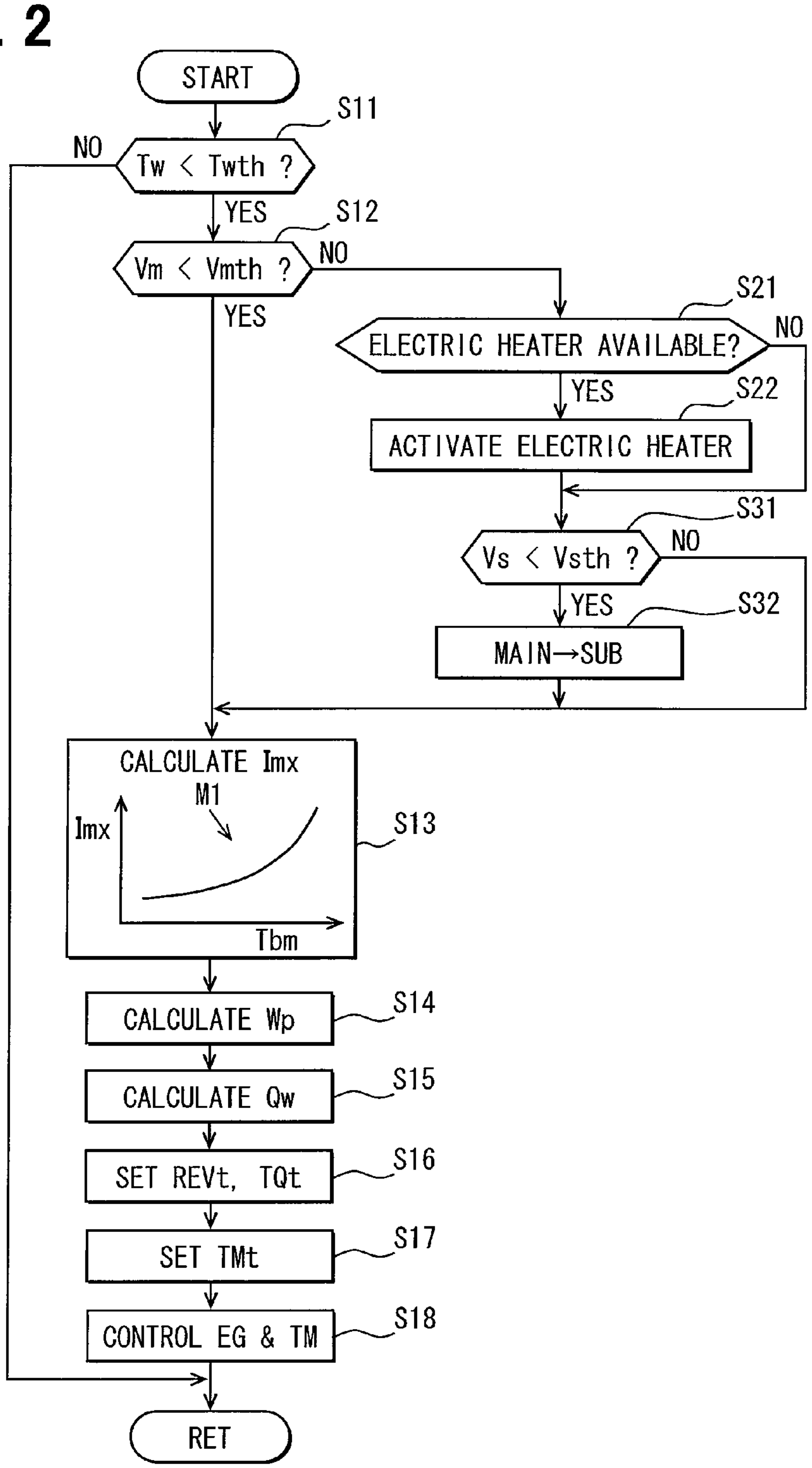
FIG. 2 is a flow chart showing a processing order of a a warming-up control according to a first embodiment.

FIG. 2 is a flow chart which is carried out by the microcomputer in the engine controller 52 and which shows processing order of the warming-up operation control. The processing is repeatedly performed with a predetermined interval.

Referring to FIG. 2, in a step of S11, it is determined that whether a coolant temperature Tw is less than a predetermined threshold value Twth or not. If Tw>Twth or Tw=Twth is established, it is possible to assume that no warming-up operation is needed. Then, the control processing is branched to NO in S11 and is finished. The coolant temperature Tw represents an temperature of the engine 10. Therefore, the coolant temperature may be replaced with any temperature indicative of an engine temperature. Therefore, it is possible to determine that whether a warming-up operation is needed or not based on any temperature indicative of the engine temperature.

If Tw<Twth is established, the control processing is branched to YES in S11 and sets a flag, which request a warming-up operation. In S12, it is determined that whether a residual charge Vm in the main battery 43 is less than a predetermined threshold value Vmth or not. The residual charge Vm corresponds to a residual amount of charge in the main battery 43. The residual charge Vm may be calculated based on an income and outgo of the main battery 43, which can be shown by an amount of charging current and an amount of discharge current. Alternatively, the charge may be calculated based on a detected value of voltage of the main battery 43. The residual charge, which may be referred to as the residual amount of charge, can be indicated by an SOC, which is a State Of Charge. The SOC shows a ratio of charged amount with respect to a charged amount at the full charged condition.

If Vm<Vmth is established, the control processing is branched to YES in S12. In S13, a maximum charge current Imx, which the main battery 43 can allow, is calculated by looking up a map M1 based on a battery temperature Tbm. The maximum charge current Imx may be referred to as a permissible charge current Imx. Chemical reaction in the battery produced which is caused by charging and discharging is reduced as the battery temperature is decreased. By S12, it is possible to restrict the charge current in accordance with such a temperature characteristic of battery. The restricted value corresponds to the permissible charge current Imx.

In S14, a permissible electric power Wp which can be charged into the main battery 43 is calculated based on a target residual charge Vmt, the residual charge Vm at the present time, and a target warming-up completion time Tct. In detail, the permissible electric power can be calculated by dividing an insufficient charge between the residual charge and the target residual charge by the target warming-up completion time, and multiplying a coefficient Cs which converts an electric power into a value of the SOC to the division value. The permissible electric power Wp can be calculated by $Wp=Cs(Vmt-Vm)/Tct$. The permissible electric power Wp is adjusted so that a current to charge the main battery 43 does not exceed the permissible charge current Imx calculated at S13.

In S15, an amount of heat which is required in a warming-up operation is calculated based on a target coolant temperature Twt, the coolant temperature Tw at the present time, and a target warming-up completion time Tct. The amount of heat corresponds to a temperature increase required to complete the warming-up operation. The amount of heat may be referred to as a required heat generation Qw. In detail, the required heat generation can be calculated by dividing an insufficient temperature between the coolant temperature and the target coolant temperature by the target warming-up completion time, and multiplying a coefficient Ch which converts the coolant temperature into a heat amount to the division value. The required heat generation can be calculated by $Qw=Ch(Twt-Tw)/Tct$.

In S16, a target revolution speed REVt and a target rotational torque TQt at a warming-up are set. The target values are set based on the permissible electric power and the required heat generation and a predetermined setting characteristic shown by lines Em, Eh1, and Eh2 in FIG. 3. The target values are set by referencing to the optimal shaft efficiency line (OPTML) Em and a plurality of warming-up operation lines (WARML) Eh1, Eh2. Hereafter, these lines Em, Eh1, and Eh2 are explained.

Figure 3:
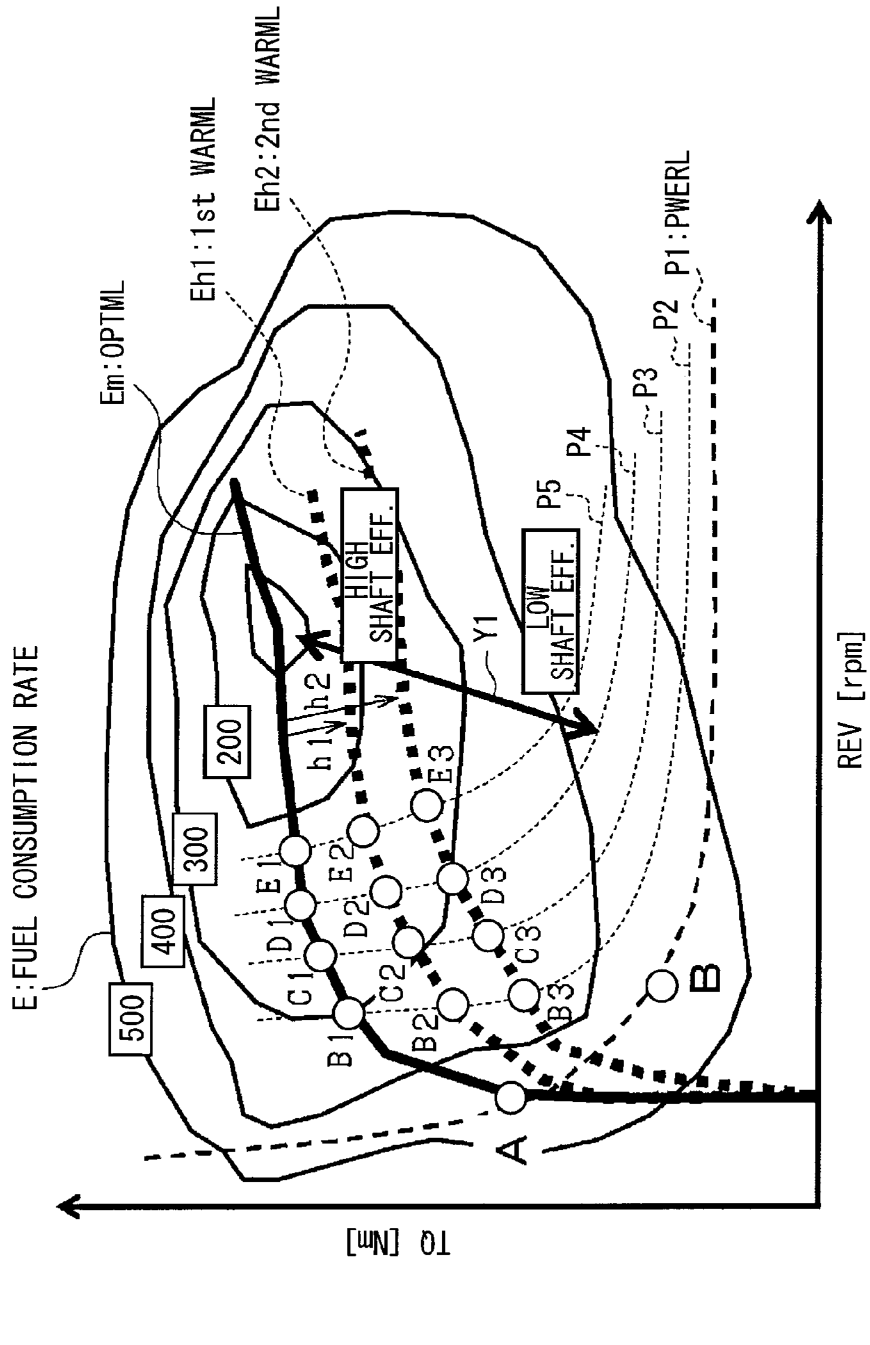
FIG. 3 is a contour map about fuel consumption rate (FCONR) (shaft output efficiency (SHTEF)) according to a first embodiment, and shows an optimal shaft efficiency operation line (OPTML) for operating an engine at an optimal shaft efficiency, and a warming-up operation line (WARML) for operating an engine at improved warming-up effect.

Solid lines E in FIG. 3 show the contour lines of a fuel consumption rate FCR which corresponds to a shaft efficiency. If at least one of REV and TQ differs under the same engine output, the shaft efficiency may differ. Each of the contour lines E is a line which connects operational points indicated by REV and TQ that create the same shaft efficiency. Broken lines P1-P5 are power equivalent lines (PWERL) which connect the points that the engine 10 generates the same power.

The operational points B1-B3 are on the same power equivalent line, and are different in the shaft efficiency due to a difference of REV and TQ. The operational points C1-C3, D1-D3, and E1-E3 are similar to the above. The shaft efficiency is decreased in the alphabetical order, such as from B1 to E1, from B2 to E2, and from B3 to E3. An arrow Y1 shows high and low directions of the shaft efficiency. A heat loss rate HLR becomes higher as the shaft efficiency is decreased. An arrow Y2 in FIG. 4 shows high and low directions of the heat loss rate.

Figure 4:
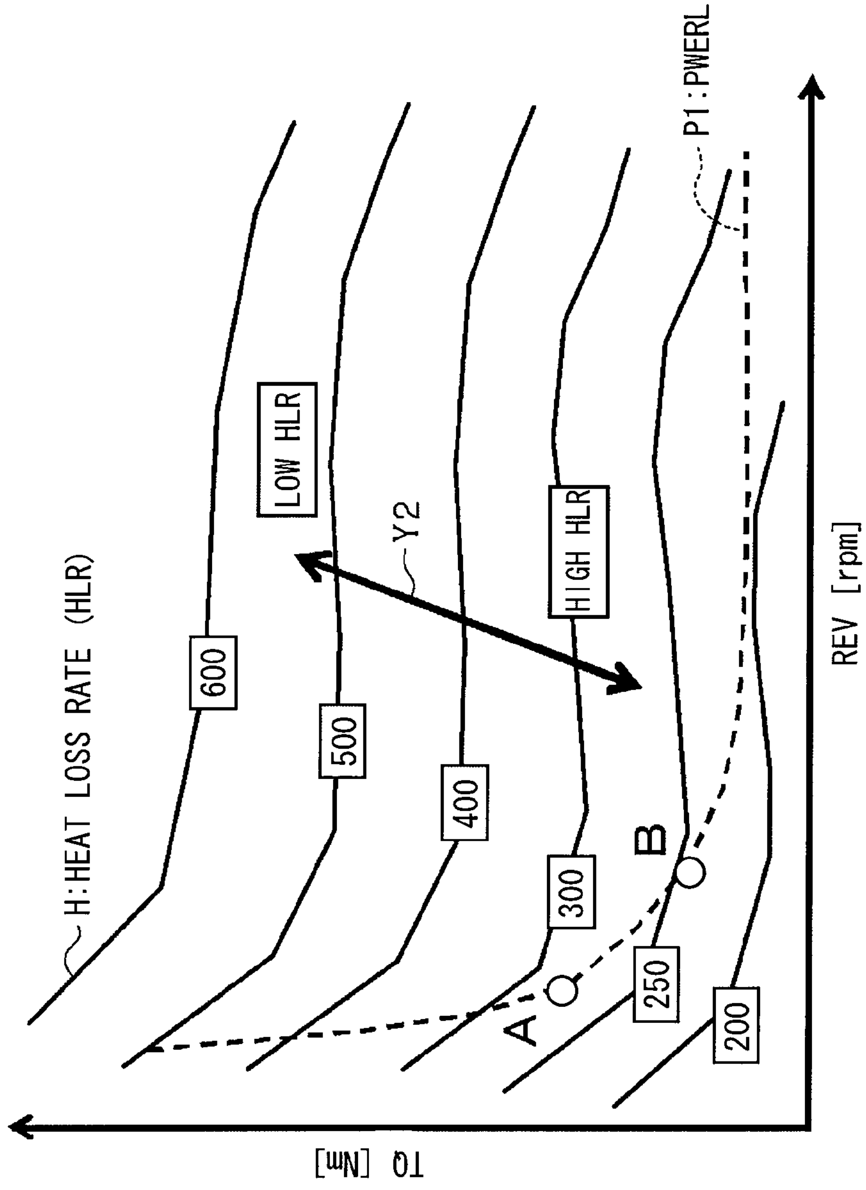
FIG. 4 is a contour map about heat loss rate (HETLR)

Solid lines H in FIG. 4 show the contour lines of the heat loss rate. The heat loss rate HLR has the unit g/kWh, and is expressed by $HLR=FC/HL$, where FC is a fuel consumption amount (g/h) per unit time, and HL is a heat loss (kW) of the engine 10. If at least one of REV and TQ differs under the same engine output, the heat loss rate may differ. Each of the contour lines H is a line which connects operational points indicated by REV and TQ that create the same heat loss rate.

As shown by the arrow Y1 in FIG. 3, the shaft efficiency is lowered as TQ and REV becomes low. However, as shown by the arrow Y2 in FIG. 4, the heat loss rate is increased as TQ and REV becomes low. In other words, the heat loss rate can be decreased by setting TQ and REV to increase the shaft efficiency. The heat loss rate can be increased by setting TQ and REV to decrease the shaft efficiency.

Referring to FIG. 3, a point that provides the maximum shaft efficiency on each one of the power equivalent lines P1-P5 is referred to as an optimal shaft efficiency point. The points A, B1, C1, D1, and E1 are the optimal shaft efficiency points. A line provided by connecting the optimal shaft efficiency points is the optimal shaft efficiency line (OPTML) Em.

The warming-up operation lines (WARML) Eh1 and Eh2 are defined based on OPTML Em. WARML Eh1 and Eh2 are defined by shifting from OPTML Em to a direction to increase the heat loss. Therefore, WARML Eh1 and Eh2 are defined to generate more heat loss than OPTML Em. A shifting amount h1 for WARML Eh1 is set smaller than a shifting amount h2 for WARML Eh2. The shifting amounts may be referred to as correcting amount. That is, OPTML Em is an engine operational line which is defined by giving the highest or higher priority to the shaft efficiency than the heat loss. First WARML Eh1 is an engine operational line which is defined by giving more priority to the heat loss than OPTML Em. Second WARML Eh2 is an engine operational line which is defined by giving more priority to the heat loss than WARML Eh1. Therefore, when the engine 10 is operated on OPTML Em, the shaft efficiency could reach the almost highest level, but the heat loss could not reach the highest level. When the engine 10 is operated on WARML Eh1, the shaft efficiency would be lower than that on OPTML, but the heat loss would be more than that on OPTML. When the engine 10 is operated on WARML Eh2, the shaft efficiency would be lower than that on WARML Eh2, but the heat loss would be more than that on WARML Eh1. In other words, the controller can provide a plurality of engine operational modes which are different in expected heat loss.

The operational point "A" defines an engine output that is determined based on a demand of power for driving the vehicle. The point "A" is on OPTML Em and is defined by REV and TQ. When increasing the engine output further from the point "A" in response to a warming-up demand, it is desirable, in view of improving the shaft efficiency, to increase the operational point along OPTML Em, promoting a warming-up by an increased amount of the heat loss, and generates electricity by an increased amount of the rotational output while charging it to the main battery 43. However, if the battery has no capacity to receive generated electricity, the increased amount of the rotational output will become useless. In this case, it is desirable to increase the engine output by shifting the operational point along one of WARML Eh1 and Eh2. By shifting the operational point along WARML, it is possible to suppress an increase of the rotational output and promote an increase of the heat loss.

Therefore, when increasing the engine output further from the operational point "A" in response to the warming-up demand, it is desirable to increase both the coolant temperature Tw and the residual charge Vm in a balanced manner. For example, the shaft efficiency for the whole warming-up period could not be improved sufficiently by performing a warming-up operation in which an output is increased along the optimal shaft efficiency line Em until a full charged condition is achieved, and is increased along a warming-up operation line, which is corrected substantially, after the full charged condition is achieved.

Figure 5:
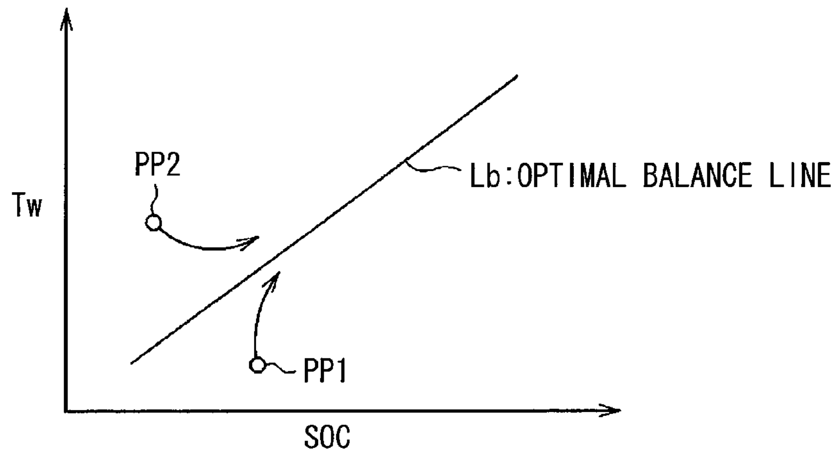
FIG. 5 is a graph showing an optimal balance line.

FIG. 5 shows an optimal balance line Lb which shows an optimal balance of the temperature Tw and the residual charge at the time of increasing both the temperature Tw and the residual charge in a well balanced manner. Points PP1 and PP2 show examples of operational points defined by the residual charge and the temperature. In a case of the point PP1, the present operational point is located on a side where the residual charge is more than the optimal balance line Lb. In this case, the engine is operated to increase the output along WARMLs Eh1 and Eh2 by giving relatively lower priority to the shaft efficiency. It is possible to suppress an increase of the residual charge and to accelerate an increase of the temperature. As a result, both the residual charge and the temperature are increased along the optimal balance line Lb in a well balanced manner. Therefore, it is possible to reduce possibility of the full charged condition during the warming-up operation.

In a case of the point PP2, the present operational point is located on a side where the temperature is higher than the optimal balance line Lb. In this case, the engine is operated to increase the output along OPTML Em by giving relatively higher priority to the shaft efficiency. It is possible to accelerate an increase of the residual charge and to suppress an increase of the temperature. As a result, both the residual charge and the temperature are increased along the optimal balance line Lb in a well balanced manner. Therefore, it is possible to improve the shaft efficiency by reducing the shifting amounts h1 and h2.

A degree which gives priority to an improvement of the shaft efficiency more than an increase of the increasing amount of the temperature may be defined as a shaft efficiency priority degree. In this embodiment, the shaft efficiency priority degree is set higher when the residual charge and the temperature at the present time are on a side region of the balance line Lb where the point PP2 is located. The shaft efficiency priority degree is set lower when the residual charge and the temperature at the present time are on a side region of the balance line Lb where the point PP1 is located. In this embodiment, it can be said that the shifting amounts h1 and h2 to OPTML Em are set in a variable manner according to the set value of the shaft efficiency priority degree.

The above description discloses modules which sets the target revolution speed REVt and the target rotational torque TQt in S16. Next, an example of modules which sets the engine output, REV, and TQ by using the described procedure.

OPTML Em and WARMLs Eh1 and Eh2 can be determined and obtained by performing experimental operations on the system. OPTML Em and WARMLs Eh1 and Eh2 are previously stored in the memory device in the engine controller 52. Alternatively, the operational points B1433, C1-C3, D1-D3, and E1-E3 may be stored. The engine controller 52 calculates a heat generation amount and a charge electric power in a case that the engine 10 and the transmission 13 are controlled by these operational points. The heat generation amount shows a heat amount generated at each operational point. The charge electric power shows an electric power which can be charge at each operational point.

Next, an operational point in which the charge electric power calculated is less than the permissible electric power calculated in S14, and the heat generation amount calculated is more than the required heat generation calculated in S15 is selected. In a case that a plurality of operational points meet the above requirements, one operational point which is closest to the optimal balance line Lb is selected. In other words, one operational point which gives the shortest distance to the optimal balance line Lb is selected. Alternatively, one operational point which provides the greatest value in the heat generation amount may be selected. Then, a revolution speed and a torque of the engine obtained by the selected operational point are set as target values. In other words, the engine controller 52 selects an operational point on an operational line having a greater shifting amount h1 and h2, as the shaft efficiency priority degree becomes small.

Returning to FIG. 2, in S17, a target gear ratio TMt of the transmission 13 is set to a value which makes REV to the target REVt set in S16. When the engine 10 is stopped, the target gear ratio TMt is set at a fixed value, e.g., 1.0. In S18, engine control variables such as a fuel injection amount and ignition timing are controlled in order to control the engine 10 to output the engine output on an operational point selected in S16. The transmission 13 is also controlled to provide the target gear ratio TMt set in S17.

If Vm<Vmth is not established in S12, the control processing is branched to NO in S12. In this case, the residual charge Vm is equal to or greater than the threshold Vmth. In S21, it is determined that whether an electric heater is available to heat the coolant or not. The electric heater is provided by the heat pump system 30. The electric heater may be provided by the other electric powered heater device, such as a joule heating device, e.g., a glow-plug or a resistance heating wire. If the electric heater is available, the control processing branches to YES in S21. In S22, an output of the electric heater is set and the electric heater is activated.

In detail, the output of the electric heater is set so that the required heat generation calculated in S15 becomes less than a heat threshold, and the permissible electric power calculated in S14 becomes less than a chargeable amount in the main battery 43. The heat threshold is a sum of a heat loss amount q1 and a heating amount q2. The heat loss amount q1 indicates a heat amount caused by an increase of engine output. The heating amount q2 indicates an amount of heat supplied by the electric heater. The chargeable amount indicates a vacant of the battery 43. The chargeable amount may be calculated by subtracting the residual charge and a consumption of the electric heater from a full capacity of the main battery 43. Since the main battery 43 can transfer the electricity to the sub battery 44 via the converter 45, therefore, the chargeable amount may be calculated based on a total capacity of the main battery 43 and the sub battery 44.

In a case that there is sufficient margin for the residual charge in the main battery 43, the control processing branches to NO in S12, and activates the electric heater to promote temperature increase of the coolant. In other words, in a case that the main battery 43 has sufficient charge, the system performs a warming-up operation by activating the electric heater, i.e., the heat pump system 30. By activating the electric heater, it is possible to lower the charge in the main battery 43. This avoids a full charge condition of the main battery 43 which may prevent a control to increase the engine output along the optimal shaft efficiency line Em. Therefore, it is possible to reduce possibility that the control for increasing the engine output cannot be performed.

In S31, it is determined that whether a residual charge Vs of the sub battery 44 is less than a predetermined threshold Vsth or not. If the result in S31 is affirmative, the controller controls the converter 45 to transfer the electricity from the main battery 43 to the sub battery 44.

In a case that there is sufficient margin for the residual charge in the main battery 43, and the sub battery 44 has sufficiently large chargeable amount, then, the control processing branches to YES in S31, and performs power transfer. This avoids a full charged condition of the main battery 43 which may prevent a control to increase the engine output along the optimal shaft efficiency line Em. Therefore, it is possible to reduce possibility that the control for increasing the engine output cannot be performed. In this embodiment, the memory device in the engine controller 52 provides a storing section which stores a warming-up operation line (WARML: Eh1, Eh2). The WARML is defined by shifting an optimal shaft output efficiency line (OPTML: Em) to a side to increase heat loss. The OPTML is determined by drawing a line which passes through optimal shaft efficiency points for each engine output level. The optimal shaft efficiency points are combinations of revolution speed and torque of the engine for maximizing the shaft efficiency which is a rate of the rotational output of the engine to fuel consumption. The engine controller 52, e.g., S18, provides a performing section which performs a warming-up operation by operating the engine at a revolution speed and a torque on the warming-up operation line. The storing section further stores an optimal balance line which shows an optimal balance between a temperature of the engine or a coolant and a residual charge of the battery for performing the warming-up operation. The performing section determines a shaft efficiency priority degree, which is a degree for giving priority to an improvement of the shaft efficiency more than an increase of the temperature, based on the temperature of the engine or the coolant at the present time, the residual charge at the present time, and the optimal balance line. The performing section variably sets a shifting amount of the warming-up operation line to the optimal shaft efficiency line according to the determined shaft efficiency priority degree. The performing section sets the shifting amount of the warming-up operation line to the optimal shaft efficiency line small as the engine output becomes low. The performing section increases the engine output so that the engine output does not exceed a limit value, when a charging current flowing to the battery is limited to the limit value due to a low temperature of the battery. The performing section increases power consumption of an electric heater on the vehicle when the residual charge is equal to or higher than a predetermined value. The performing section transfers electric power from the battery to another battery when the residual charge is equal to or higher than a predetermined value.

According to the embodiment, a warming-up operation is performed. In the operation, the warming-up is accelerated by increasing the engine output. Simultaneously, an amount of increased rotational output caused by increasing the engine output is assigned to generate electric power, and generated electric power is charged to the main battery 43. For performing such the warming-up operation, the warming-up operation lines (WARML) Eh1 and Eh2 defined by shifting the optimal shaft output efficiency line Em to a side to increase heat loss are defined and set previously. In the warming-up operation, a revolution speed REV and a torque when increasing an engine output are set up based on the operational points B1-E3 on the plurality of operational lines Em, Eh1, and Eh2. Therefore, it is possible to perform a warming-up operation while increasing or maintaining certain level of the shaft efficiency. It is possible to reduce cases in which the warming-up operation cannot be performed or completed during a next warming-up operation due to a full charge. In case of conventional vehicles which has no motor but has an engine alone for a driving source, a warming-up control in which a revolution speed is increased is widely used. If the conventional warming-up operations applied to a hybrid vehicle, the warming-up operation is performed by changing the operational point "A" to an operational point "B" shown in FIGS. 3 and 4 on an equal-power line. In this case, the shaft efficiency may be lowered.

(Second Embodiment)

Figure 6:
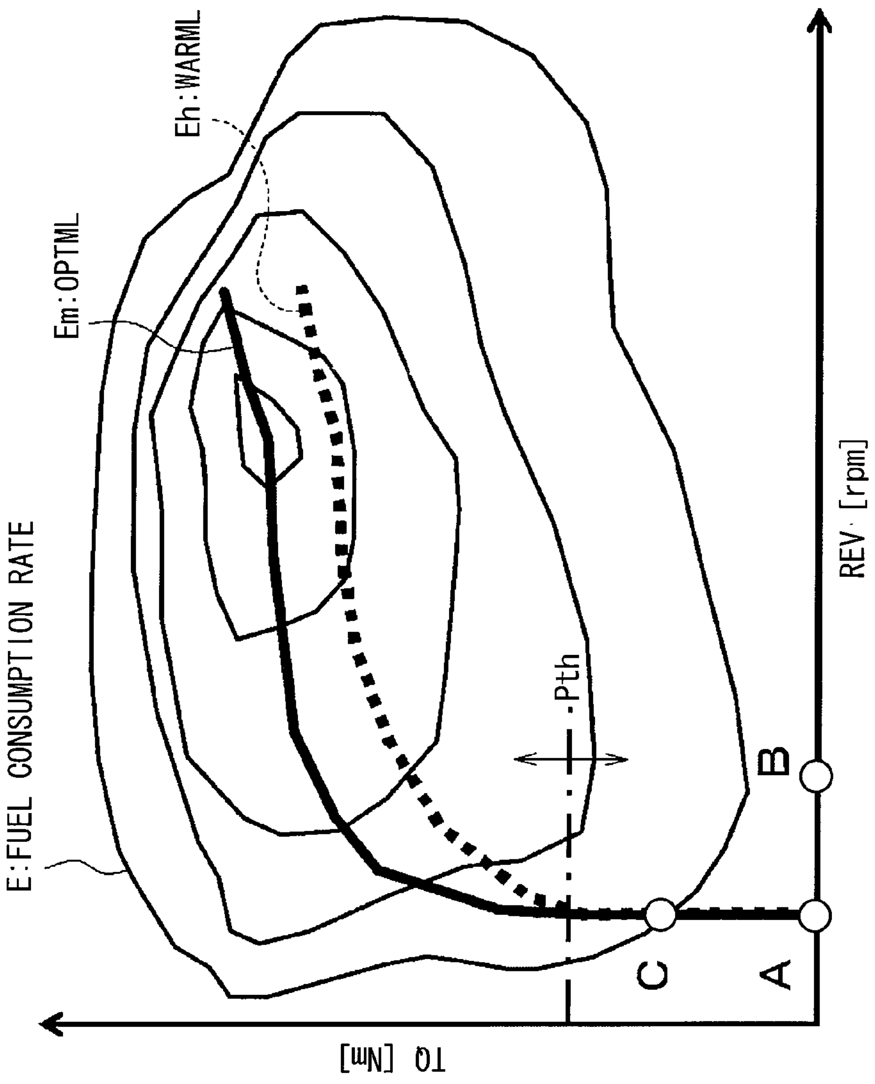
FIG. 6 is a contour map about fuel consumption rate according to a second embodiment.

FIG. 6 shows an embodiment. In this embodiment, when the engine output demanded is equal to or more than a predetermined value Pth, the optimal operational point for a warming-up control is selected by using a similar way as explained in the above embodiment. The optimal operational point is selected from a plurality of operational points on the optimal shaft efficiency line Em and a plurality of operational points on the warming-up operational lines Eh1 and Eh2. However, when the engine output demanded is less than the predetermined value Pth, the optimal operating point for a warming-up control is selected from a plurality of operational points on the optimal shaft efficiency line Em. In this case, the warming-up operational line Eh is not adopted for selecting the operational point.

Therefore, the optimal shaft efficiency line Em solely used in a case that the engine output is less than the predetermined value Pth. Alternatively, in a case that the required heat generation calculated in S15 is less than a predetermined value, it may be assumed that the engine output is less than the predetermined value Pth, and the optimal shaft efficiency line Em may be solely used.

In other words, in this embodiment, the shaft efficiency priority degree is also determined. It can be said that the shaft efficiency priority degree is set maximum, when an engine output is less than the predetermined value Pth. This embodiment may be further modified to give a characteristic in which the shifting amount h1 and h2 are set smaller by setting the shaft efficiency priority degree larger as the engine output becomes lower.

Here, in a range where the engine output is low, since the shaft efficiency can be improved substantially by increasing the engine output slightly, the shaft efficiency can be improved substantially by enlarging the shaft efficiency priority degree slightly. According to the embodiment, when the engine output is less than the predetermined value Pth, the shaft efficiency priority degree is set maximum, i.e., the shifting amount h1, h2 are set minimum, e.g., 0. A warming-up control is carried out by using the optimal shaft efficiency line Em. In this embodiment, the performing section sets the shifting amount of the warming-up operation line to the optimal shaft efficiency line small as the engine output becomes low. Therefore, it is possible to improve the shaft efficiency substantially and to promote improvement effect in fuel consumption.

(Third Embodiment)

In a case of common hybrid vehicle (HV), which cannot be charged by an external power source, a charge-and-discharge control is usually performed to maintain the residual charge of the main battery 43 between an upper limit and an lower limit during an operation of the vehicle. For example, if the residual charge becomes less than the lower limit by using the electric motor, the controller automatically starts the engine 10 to charge the main battery 43. If the residual charge becomes equal to or higher than the upper limit, the controller inhibits charging to the main battery 43 to promote discharge from the main battery 43.

The embodiment discloses an improvement of a hybrid vehicle which has the upper limit of the residual charge. In the embodiment, if it is estimated that a warming-up operation will be needed at a next engine start, the controller decreases the upper limit. Decreasing the upper limit provides a chargeable capacity which can be charged at the next engine start.

Figure 7:
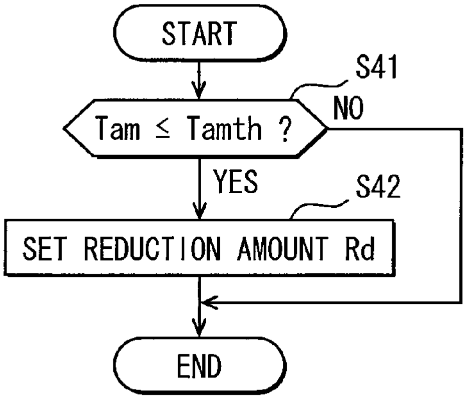
FIG. 7 is a flow chart according to a third embodiment.
Figure 8:
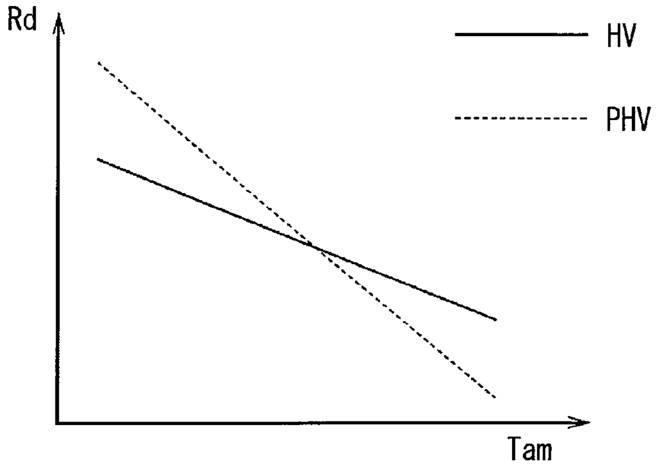
FIG. 8 is a graph for explaining a charging control according to the third embodiment.

FIG. 7 shows a flowchart for this embodiment. In step S41, it is determined that whether an ambient temperature Tam is equal to or less than a predetermined threshold value Tamth. If Tam<Tamth or Tam=Tamth is established, it is assumed that a warming-up operation will be needed at a next engine start. In this case, the control processing branches to YES in S41. Alternatively, a similar estimation can be performed by using a history of the ambient temperature Tam. In step S42, a reduction amount Rd of the upper limit of the main battery 43 is set according to the ambient temperature Tam. As shown in FIG. 8 by a solid line, the reduction amount Rd of the upper limit is set higher, as the ambient temperature Tam is lowered.

As a result, if it is assumed that a warming-up operation will be needed for a next engine start, the residual charge will be controlled less than that in case of no warming-up operation is expected. Therefore, it is possible to reduce cases in which a warming-up operation cannot be performed or completed during a next warming-up operation due to a full charge. In addition, it is highly possible that a heat amount which will be required at a next warming-up operation becomes higher as the ambient temperature Tam get lower. In the control of the third embodiment, the residual charge is decreased by increasing the reduction amount Rd of the upper limit as the ambient temperature Tam is lowered. Therefore, it is possible to further reduce a possibility of the full charge during a next warming-up operation. In this embodiment, the apparatus is applied to a hybrid vehicle which has the charge system which controls the battery so that the residual charge is maintained less than an upper limit during the operation of the hybrid vehicle. The apparatus further comprises an upper limit setting section which sets the upper limit to a lower level when it is estimated that a warming-up is necessary at the next engine start relative to that when it is estimated that a warming-up is not necessary at the next engine start.

(Fourth Embodiment)

The embodiment discloses an improvement of a plug-in hybrid vehicle (PHV) which can charge the main battery 43 by an external power source. The main battery 43 is usually charged during the PHV is parked. In the PHV, the controller controls and restricts the residual charge of the main battery 43 less than an upper limit during a charging period from the external power source.

The embodiment discloses an invention applied to the PHV which has the upper limit of the residual charge. In the embodiment, if it is estimated that a warming-up operation will be needed at a next engine start, the controller decreases the upper limit. Decreasing the upper limit provides a chargeable capacity which can be charged at the next engine start.

The flow chart in FIG. 7 is also used in this embodiment. The step S41 is performed during a charging period from the external power source. If Tam<Tamth or Tam=Tamth is established, it is assumed that a warming-up operation will be needed at a next engine start. In this case, the control processing branches to YES in S41. Alternatively, a similar estimation can be performed by using a history of the ambient temperature Tam. In step S42, a reduction amount Rd is set according to the ambient temperature Tam. The upper limit may be referred to as a limit value. As shown in FIG. 8 by a broken line, the reduction amount Rd of the upper limit is set higher, as the ambient temperature Tam is lowered. The reduction amount Rd for the plug-in hybrid vehicle (PHV) is higher than the reduction amount Rd for the hybrid vehicle (HV) at a low temperature region. The reduction amount Rd for the plug-in hybrid vehicle (PHV) is lower than the reduction amount Rd for the hybrid vehicle (HV) at a high temperature region. The characteristics PHV and HV cross at a middle temperature.

As a result, advantages similar to the preceding embodiments are achieved. Therefore, it is possible to reduce cases in which a warming-up operation cannot be performed or completed during a next warming-up operation due to a full charge. In addition, it is highly possible that a heat amount which will be required at a next warming-up operation becomes higher as the ambient temperature Tam get lower. In the control of the fourth embodiment, the residual charge is decreased by increasing the reduction amount Rd of the upper limit as the ambient temperature Tam is lowered. Therefore, it is possible to further reduce a possibility of the full charge during a next warming-up operation.

Since the PHV is usually charged during a parking period, therefore, the PHV may be fully charged when beginning a drive. However, in a case of extremely low ambient temperature, the main battery 43 may not be able to discharge sufficient amount to drive the vehicle. Therefore, even in the PHV, a warming-up of the engine may be still required. In this embodiment, the apparatus is applied to a plug-in vehicle which has the charge system being capable of charging the battery from an external power source so that the residual charge is maintained less than an upper limit when the vehicle is not operated. The apparatus further comprises an upper limit setting section which sets the upper limit to a lower level when it is estimated that a warming-up is necessary at the next engine start relative to that when it is estimated that a warming-up is not necessary at the next engine start. As shown in FIG. 8, the characteristic for the PHV is different from that for the HV. The characteristic for the PHV is defined to set a larger reduction amount Rd at a low temperature region than that set for the HV. This characteristic allows sufficient warming-up operation at a low temperature range. The characteristic for the PHV is defined to set a smaller reduction amount Rd at a high temperature region than that set for the HV. This characteristic allows the PHV to be charged to a higher level by the external power source more effectively.

(Fifth Embodiment)

In S16 of FIG. 2, the operational point is selected by calculating the charge electric power and the heat generation amount for all operational points B1-E3 on the plurality of lines Em, Eh1, and Eh2, and comparing these computed values with the required heat generation and the permissible electric power.

In this embodiment, the optimal operational line which is optimal for the required heat generation and the permissible electric power is selected from the plurality of lines Em, Eh1, and Eh2. Then, an operational point is selected from the operational points on the selected line by calculating the charge electric power and the heat generation amount, and comparing these computed values with the required heat generation and the permissible electric power.

In some preceding embodiments, the charge electric power and the heat generation amount are calculated for all operational points B1-E3. However, in this embodiment, it is possible to reduce the number of operational points on which the charge electric power and the heat generation amount are calculated. Therefore, it is possible to reduce processing load on the engine controller 52.

(Sixth Embodiment)

In some preceding embodiments, the optimal operational point is selected among the operational points B1-E3 on the plurality of lines Em, Eh1, and Eh2. However, in this embodiment, the optimal shaft efficiency line Em is not used, and the optimal operational point is selected by using one warming-up operation line. An operational point is selected from the operational points on only one line by calculating the charge electric power and the heat generation amount, and comparing these computed values with the required heat generation and the permissible electric power.

In some preceding embodiments, the charge electric power and the heat generation amount are calculated for all operational points B1-E3. However, in this embodiment, it is possible to reduce the number of operational points on which the charge electric power and the heat generation amount are calculated. Therefore, it is possible to reduce processing load on the engine controller 52.

(Other Embodiments)

In the above-mentioned embodiment, the engine controller 52 stores operational lines Em, Eh1, Eh2, and Eh. The lines may be stored by storing mathematical expressions showing the operational lines, or by storing a plurality of operational points B1-E3.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An apparatus for controlling engine warming-up for a vehicle, the apparatus comprising:

a charge system configured to generate electric power by using rotational output of an engine for a driving source of the vehicle and charges a battery by the generated electric power; and an engine controller for performing a warming-up by increasing an engine output in order to increase both an heat loss and an rotational output, wherein the engine controller includes a computer processor and is configured at least to:

store a warming-up operation line which is defined by shifting an optimal shaft output efficiency line to a side to increase heat loss, the optimal shaft efficiency line being determined to pass through optimal shaft efficiency points for each engine output level, the optimal shaft efficiency points being combinations of revolution speed and torque of the engine for maximizing the shaft efficiency which is a rate of the rotational output of the engine to a fuel consumption; and perform the a warming-up operation by operating the engine at a revolution speed and a torque on the warming-up operation line, the warming-up operation being performed so as to set a shifting amount of the warming-up operation line to the optimal shaft efficiency line to a small amount as the engine output becomes low so that the warming-up in a low engine output range is performed to increase both the heat loss and the rotational output by using the optimal shaft efficiency line or the warming-up operation line defined by a small shifting amount, and the warming-up in a high engine output range is performed to increase the heat loss by using the warming-up operation line defined by a large shifting amount, and a charge system controller configured to control the charge system to generate the electric power equivalent to an increased amount of the rotational output increase by the engine controller.

2. The apparatus in claim 1, wherein the engine controller is further configured at least to:

store an optimal balance line which shows an optimal balance between a temperature of the engine or a coolant and a residual charge of the battery for performing the warming-up operation, and wherein determine a shaft efficiency priority degree, which is a degree for giving priority to an improvement of the shaft efficiency more than an increase of the temperature, based on the temperature of the engine or the coolant at the present time, the residual charge at the present time, and the optimal balance line, and variably set a shifting amount of the warming-up operation line to the optimal shaft efficiency line according to the determined shaft efficiency priority degree.

3. The apparatus in claim 1, wherein the engine controller is further configured at least to:

increase the engine output so that the engine output does not exceed a limit value, when a charging current flowing to the battery is limited to the limit value due to a low temperature of the battery.

4. The apparatus in claim 1, wherein the engine controller is further configured at least to:

increase power consumption of an electric heater on the vehicle when the residual charge is equal to or higher than a predetermined value.

5. The apparatus in claim 1, wherein the engine controller is further configured at least to:

transfer electric power from the battery to another battery when the residual charge is equal to or higher than a predetermined value.

6. The apparatus in claim 1, wherein the apparatus is applied to a hybrid vehicle which has the charge system which controls the battery so that the residual charge is maintained less than an upper limit during the operation of the hybrid vehicle, and the engine controller is further configured at least to: set the upper limit to a lower level when it is estimated that a warming-up is necessary at the next engine start relative to that when it is estimated that a warming-up is not necessary at the next engine start, the necessity of the warming-up at the next engine start being estimated based on an ambient temperature.

7. The apparatus in claim 1, wherein the apparatus is applied to a plug-in vehicle which has the charge system being capable of charging the battery from an external power source so that the residual charge is maintained less than an upper limit when the vehicle is not operated, and the engine controller is further configured at least to: set the upper limit to a lower level when it is estimated that a warming-up is necessary at the next engine start relative to that when it is estimated that a warming-up is not necessary at the next engine start, the necessity of the warming-up at the next engine start being estimated based on an ambient temperature.

* * * * *